United States Patent [19]

Hoshi et al.

[11] Patent Number: 4,886,959
[45] Date of Patent: Dec. 12, 1989

[54] OPTICAL INFORMATION REPRODUCING APPARATUS

[75] Inventors: Hiroaki Hoshi, Isehara; Nozomu Kitagishi, Hachioji, all of Japan

[73] Assignee: Canon Kabushiki Kaisha, Tokyo, Japan

[21] Appl. No.: 125,003

[22] Filed: Nov. 24, 1987

[30] Foreign Application Priority Data

Nov. 27, 1986 [JP] Japan .................... 61-280836
Jun. 19, 1987 [JP] Japan .................... 62-151406

[51] Int. Cl.$^4$ .............................. G01J 1/20
[52] U.S. Cl. ............................ 250/201; 369/112
[58] Field of Search ............... 369/44, 45, 46, 109, 369/112, 122; 250/201

[56] References Cited

U.S. PATENT DOCUMENTS 4,410,241 10/1983 de Lang et al. ............ 350/409
4,643,538 2/1987 Wilson ...................... 350/421
4,709,139 11/1987 Nakamura et al. ......... 250/201
4,731,527 3/1988 Nomura et al. ............ 250/201
4,733,065 3/1988 Hoshi et al. ............... 250/201
4,742,219 5/1988 Ando ........................ 250/201

Primary Examiner—Frank Gonzalez
Attorney, Agent, or Firm—Fitzpatrick, Cella, Harper & Scinto

[57] ABSTRACT

An optical information reproducing apparatus comprises a photo-detector, a focusing optical system for focusing an information recording plane of a record carrier having a transparent layer on this recording plane to the photo-detector and an optical element for compensating for astigmation caused by the transparent layer to enhance reliability of information reproduction, and the optical axis of the focusing optical system is inclined relative to a normal line to the information recording plane.

11 Claims, 6 Drawing Sheets

OPTICAL INFORMATION REPRODUCING APPARATUS

BACKGROUND OF THE INVENTION

1. Field of the Invention

The present invention relates to an optical information reproducing apparatus, and more-particularly to an optical information reproducing apparatus which reproduces information by focusing an information recording plane of an information record medium onto a photo-detector by a focusing optical system having an optical axis inclined to a normal line to the information recording plane.

2. Related Background Art

Recently, there has been great demand to increase the density of information recording. To satisfy such a request, an optical information recording and reproducing system has been utilized. In the optical information recording and reproducing system, since an information unit for recordal may be an illumination spot formed by light irradiation through an optical system, the recording density is very high. Further, since record/reproduce means need not be contacted to the record medium to record and reproduce information, abrasion of the record medium and recording and reproducing means is eliminated.

The record medium used in such an optical information recording and reproducing system may be of disk-shape, card-shape or tape-shape, but a card-shaped record medium (optical card) is preferable from a standpoint of portability, and the range of application is expected to more and more expand.

Such optical cards may be one on which information is recorded by the direction of magnetization and in which information can be repeatedly written, read or erased, one on which information is recorded by a pit pattern and in which information may be additionally written and read, and one which is a read-only type in which information is recorded by reflection factor. Those cards are used depending on their characteristics.

When a large number of cards having the same information recorded thereon are to be manufactured, the read-only optical cards (optical ROM cards) which have a high S/N ratio and are easy to manufacture are preferably used.

The optical ROM card is manufactured in the following manner. On a plastic substrate having a thickness of several hundreds $\mu$m, an evaporated film of a low reflection factor metal such as Te is formed, a mask corresponding to a record information pattern is mounted on the evaporated film, a high reflection factor metal such as Cu is formed thereon, and an optically transparent plastic film having a thickness of several hundreds $\mu$m is laminated on the low reflection factor metal film and the patterned high reflection factor metal film to form a protective film.

Figure 1:
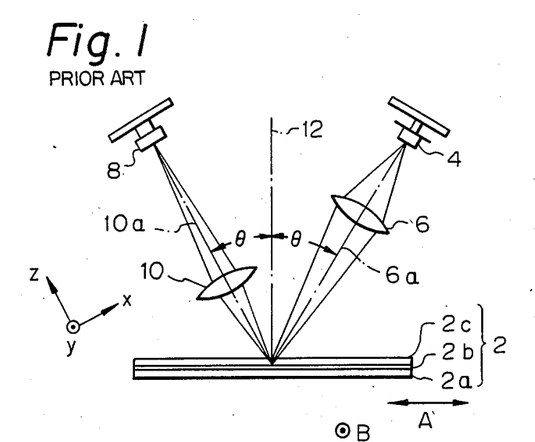
FIG. 1 shows an optical head in a prior art reproducing apparatus used to reproduce information recorded in an optical ROM card.

FIG. 1 shows an optical head of a conventional reproducing apparatus used to reproduce information recorded on such an optical ROM card.

In FIG. 1, numeral 2 denotes an optical ROM card which comprises a substrate 2a, an information record plane 2b and a transparent protective layer 2c. Numeral 4 denotes an illumination light source which may be an LED or a semiconductor laser. Numeral 6 denotes a condenser lens of an illumination optical system, and numeral 6a denotes an optical axis thereof. The optical axis inclines by an angle $\theta$ with respect to the information record plane 2b of the optical ROM card 2. Numeral 8 denotes a photo-detector which may be a CCD line sensor. Numeral 10 denotes a focusing lens of a focusing optical system and numeral 10a denotes an optical axis thereof. The optical axis inclines by the angle $\theta$ with respect to the information record plane 2b of the optical ROM card 2. The optical axis 10a and the optical axis 6a of the condenser lens 6 are symmetric with respect to a normal line 12 to the information record plane of the optical ROM card 2.

The illumination light emitted from the light source 4 is focused by the illumination optical system and it passes through the protective layer 2c of the optical ROM card 2 and illuminates a predetermined area on the information record plane 2b. The predetermined area of the information record plane 2b thus illuminated is focused onto the photo-detector 8 by the focusing optical system.

On the information record plane 2b of the optical ROM card 2, an appropriate number of record bits which are information units are arranged in a direction B to form an information track, and an appropriate number of such information tracks are arranged in a direction A to form a band, and an appropriate number of such bands are arranged in the direction B to form an information record area.

The photo-detector 8 has photo-sensing elements linearly arranged in the direction B, and at least one entire information track of the information record plane of the optical ROM card 2 is focused onto the photo-detector. In reproducing the information, the information tracks in the desired band are sequentially focused onto the photo-detector 8 which the optical ROM card 2 is continuously or intermittently moved in the direction A by drive means (not shown) to read the information. When information in an other band is to be read, the optical ROM card 2 is moved in the direction B by a predetermined distance by drive means (not shown) and the information is read while the optical ROM card 2 is moved in the direction A, in the same manner as that described above.

Such an information reproducing apparatus can utilize the illumination light more effectively than an information recording apparatus of a type in which the optical axis of the illumination optical system is along the normal line to the information record plane 2b of the optical ROM card 2 and a light flux reflected in that direction is split by a half-mirror and focused onto the photo-detector. In reproducing the optical ROM card, the predetermined area on the information record plane having a certain area is focused onto the photo-detector by the focusing optical system to read the information. Accordingly, it is very important to enhance the utilization efficiency of the illumination light.

However, in such an information reproducing apparatus, when the information is to be reproduced from the optical ROM card, the transparent protective layer on the information recording plane optically functions as a parallel plate arranged obliquely to the optical system and hence astigmatism occurs in focusing the recording plane. As a result, a depth of focus is very shallow and in-focus control is difficult to attain and the resolution power is apt to be reduced.

Figure 7:
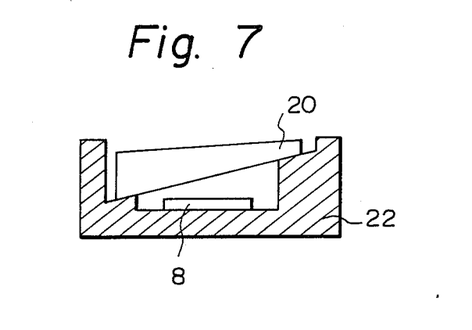
FIG. 7 shows a sectional view of a package of a photo-detector in a sixth embodiment of the present invention.

In a parallel plate having a thickness of d and a refractive index of n', astigmatism $\Delta p$ is expressed by $$\Delta p = d(1 - \cos^2 i / \cos^2 i' / n' \cos i') \tag{1}$$

$$\sin i = n' \sin i' \quad (2)$$

where i is an exit angle of the light (corresponding to θ in FIG. 7) and i' is a refraction angle in the parallel plate.

Accordingly, where the thickness d of the transparent protective layer 2c of the optical ROM card 2 is 400 μm, the refractive index n' of the protective layer is 1.6 and the angle θ in FIG. 7 is 30°, then i' is 18.2° and the astigmatism Δp is approximately 44 μm.

In the reproducing apparatus of the optical ROM card, a focus error in the direction of optical axis of the information recording plane 2b when the card is carried is in the order of 100 μm. Since the astigmatism is relatively large compared to the focus error, the effect on the depth of focus is large, the in-focus control is difficult to attain and the reliability of information reproduction is reduced.

SUMMARY OF THE INVENTION

It is an object of the present invention to provide an optical information reproducing apparatus which reproduces information by focusing an information recording plane to a photo-detector by a focusing optical system having an optical axis inclined relative to a normal line to the information recording plane on a side of an optical information record carrier having a transparent layer on the information recording plane, and in which astigmatism caused by the transparent layer is reduced to enhance a focusing ability to enhance reliability of information reproduction.

Other objects of the present invention will be apparent from the description of the embodiments of the present invention.

DETAILED DESCRIPTION OF THE PREFERRED EMBODIMENTS

In accordance with the present invention, there is provided an optical information reproducing apparatus which reproduces information by focusing an information recording plane to a photo-detector by a focusing optical system having an optical axis inclined relative to a normal line to the information recording plane on a side of an optical information recording carrier having a transparent layer on the information recording plane, and which incorporates an optical element for compensating astigmatism caused in the focusing optical system by the record carrier transparent layer.

Embodiments of the present invention are explained with reference to the drawings.

Figure 2A:
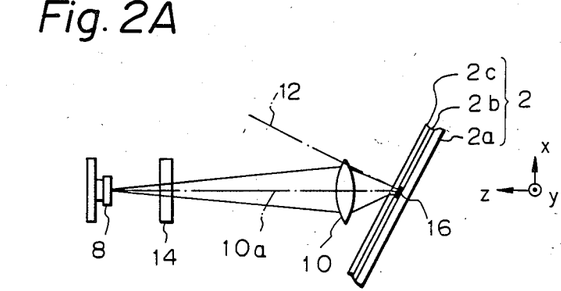
FIGS. 2A–2D show major portions of a first embodiment of an optical information reproducing apparatus of the present invention.
Figure 2B:
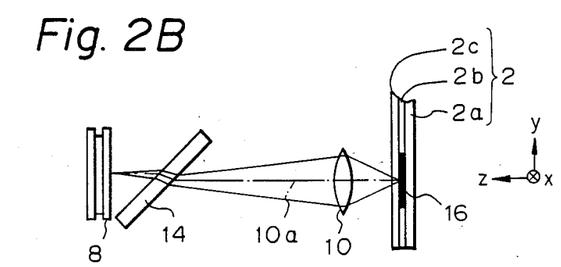

FIGS. 2A and 2B show major portions of an optical system in a first embodiment of the optical information reproducing apparatus of the present invention. In the present embodiment, an optical ROM card is used as an optical information record carrier.

In FIGS. 2A and 2B, numeral 2 denotes an optical ROM card which comprises a substrate 2a, an information recording plane 2b and a transparent protective layer 2c. Numeral 8 denotes a photo-detector, numeral 10 denotes a focusing lens of a focusing optical system and numeral 10a denotes an optical axis thereof. The optical axis 10a inclines by an angle θ with respect to the information recording plane 2b of the optical ROM card 2 as it does in FIG. 1.

Figure 2C:
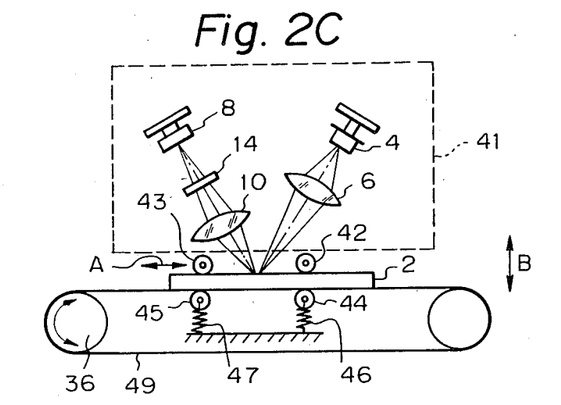

FIG. 2C shows a card driver in the present embodiment. An upper limit of movement of the optical ROM card 2 in a direction B is restricted by rollers 42 and 43 which are hold means fixed to a holding member (not shown), and the optical ROM card 2 is pressured from the bottom by rollers 44 and 45 fixed to spring members 46 and 47 as pressing means through a belt 49. Accordingly, the warp of the optical ROM card 2 is prevented and the optical ROM card 2 is held at a constant vertical position (direction B). The optical ROM card 2 is movable in a direction A by the belt 49 which is driven by a rotation mechanism 36 rotating in a direction of an arrow. The transparent protective layer is also moved in the direction A. Numeral 41 denotes an optical head.

Figure 2D:
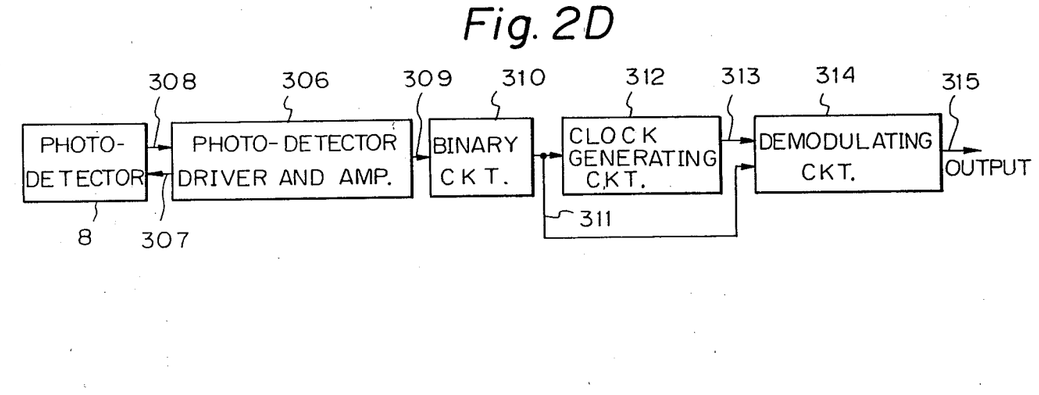

FIG. 2D shows a block diagram of a reproducing unit for reproducing information of the optical ROM card. The photo-detector 8 is driven by a drive clock 307 from a photo-detector driver/amplifier 306. An output signal 308 thereof is amplified by the driver/amplifier 306 and it is supplied to a binarizing circuit 310 as a video signal 309. The binarized video signal from the binarizing circuit 310 is supplied to a clock reproduce circuit 312 and a demodulate circuit 314 as a signal 311.

The clock reproduce circuit 312 extracts a clock signal 313 from the signal 311 and supplies it to the demodulate circuit 314, which receives the clock signal 313 and the signal 311 to produce a demodulated signal or reproduced information signal 315.

In the present embodiment, a transparent parallel plate 14 is arranged between the focusing lens 10 and the photo-detector 8. The parallel plate is inclined with respect to the optical axis 10a of the focusing lens 10 in a direction (in a plane y-z) orthogonal to a direction (in a x-z plane) along which the information recording plane 2b inclines with respect to the optical axis 10a.

In FIG. 2, the z-axis represents the direction of the optical axis 10a of the focusing lens 10, the x-axis represents the direction orthogonal to the z-axis on a plane defined by the optical axis and the normal line to the information recording plane 2b of the optical ROM card 2, and the y-axis represents the direction orthogonal to both the x-axis and the y-axis.

On the information recording plane 2b, the information tracks are defined along the y-axis and the photo-sensing elements of the photo-detector 8 are also arranged along the y-axis. One information track 16 at a predetermined position is focused onto the photo-detector 8 so that the information is read.

In the present embodiment, a predetermined area on the information recording plane 2b of the optical ROM card 2 is illuminated as is done in FIG. 1.

In the present embodiment, the direction of inclination of the information recording plane 2b of the optical ROM card 2 is orthogonal to the direction of inclination of the parallel plate with respect to the optical axis 10a of the focusing lens 10. Accordingly, the astigmatism created by the transparent protective layer 2c of the optical ROM card 2 is compensated.

The astigmatism $\Delta p$ due to the transparent protective layer 2c is expanded by a factor of $\alpha$ in the photo-detector 8, where $\alpha$ is a longitudinal magnification of a focusing lens 10. Accordingly, the astigmatism $\Delta p'$ due to the protective layer in the photo-detector 8 is represented by $$\Delta p' = \alpha \Delta p = -\beta^2 \Delta p \qquad (3)$$

where $\beta$ is a lateral magnification of the focusing ens. The astigmatism $\Delta p'$ may be compensated by the parallel plate 14 and a characteristic thereof may be determined from the equations (1) and (2). For example, where the astigmatism $\Delta p = 44$ μm is to be compensated with $\beta$ being equal to 5, the astigmatism $\Delta p' = -1.1$ mm. In order to compensate for this astigmatism, $i' = 26.2°$ from the equation (2) assuming that the refractive index n' of the compensation parallel plate 14 is 1.6 and the inclination angle i of the parallel plate is 45°. Accordingly, $d \approx 4.2$ mm from the equaiton (1). Thus, the astigmatism due to the transparent protective layer 2c can be cancelled out by arranging the parallel plate 14 having the refractive index of 1.6 and the thickness of 4.2 mm at the inclination angle of 45°.

In accordance with the present embodiment, the depth of focus of the focusing system is deep, the resolution power significantly increases and the reliability of information reproduction is enhanced.

As is apparent from the equations (1) and (2), the larger the angle between the normal line to the plane of the parallel plate 14 and the optical axis 10a is, the larger is the correction amount, and the larger the refractive index of the parallel plate 14 is, the larger is the correction amount. Accordingly, the thickness of the parallel plate 14 may be reduced. In the above example, when the angle i is 60°, the thickness d may be approximately 2.3 mm.

The correction amount may be adjusted by adjusting the inclination angle of the parallel plate 14 so that final adjustment may be made by adjusting the inclination when the apparatus is assembled. When the thickness or refractive index of the protective layer 2c varies from type to type of the optical ROM card 2, the type of the card is first discriminated and the inclination angle of the parallel plate 14 is set in accordance with the type of card, for example, the inclination of the parallel plate is changed by drive means under the control of control means (not shown) to compensate for the astigmatism.

In the present embodiment, the parallel plate 14 may be positioned at any point on the optical axis 10a so long as it is between the focusing lens 10 and the photo-detector 8.

By arranging the parallel plate 14, a focus position is moved in the y direction by a distance $\Delta y$ $$\Delta y = d \cdot \cos i \, (\tan i - \tan i') \qquad (4)$$

For example, in the above example, $\Delta y$ is approximately 1.5 mm, 1.2 mm. It does not raise a problem if it is previously taken into account when the optical system is designed.

Figure 3A:
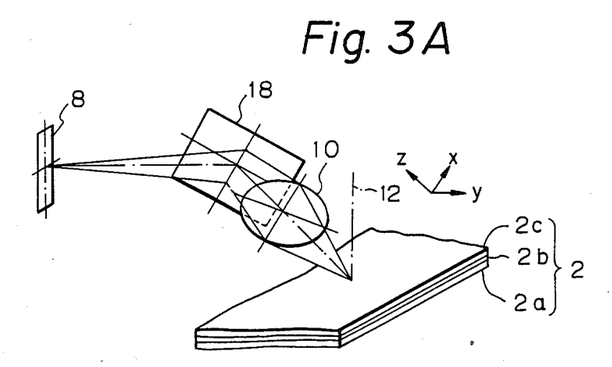
FIGS. 3A–3C show major portions of a second embodiment of the optical information reproducing apparatus of the present invention.
Figure 3B:
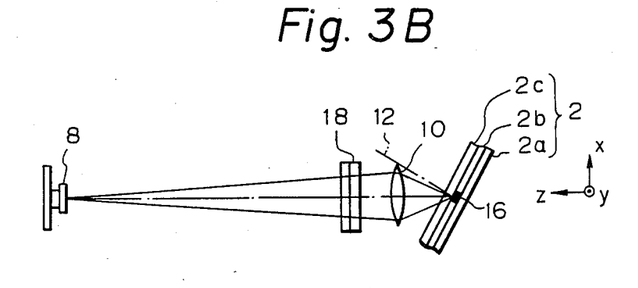
Figure 3C:
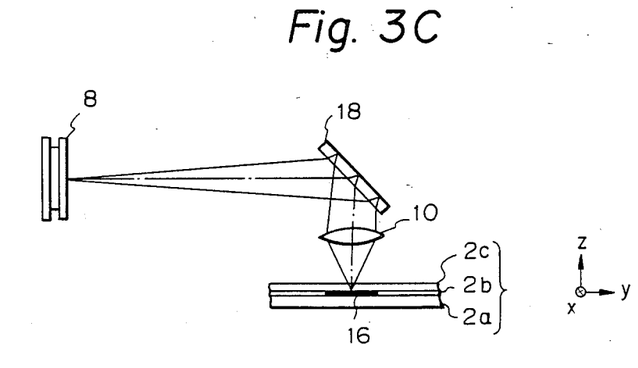

FIGS. 3A–3C show major portions of a second embodiment of the optical information reproducing apparatus of the present invention. In the present embodiment, a drive unit and a reproduce unit are identical to those of FIG. 1 and hence explanation thereof is omitted. FIG. 3A shows a perspective view and FIGS. 3B and 3C are similar to FIGS. 2A and 2B, respectively, except that FIG. 3B shows a partial developed view.

The present embodiment differs from the first embodiment in that a back surface mirror 18 having a reflective plane on a back surface of a transparent parallel plate is used in place of the transparent parallel plate as an element to compensate for the astigmatism. In the present embodiment, as shown in FIG. 3C, the light flux passes through the parallel plate of the back surface mirror 18 twice. Accordingly, the same effect is attained with one half thickness of the parallel plate of the first embodiment and the weight of the apparatus can be reduced.

In the present embodiment, since the focusing light flux is deflected by the back surface mirror 18, a space along the normal line to the optical ROM card is smaller than that of the first embodiment where the light flux is extended. Thus, in the present embodiment, the optical head can be thinned, and the compact and thin optical head can be provided.

Figure 4:
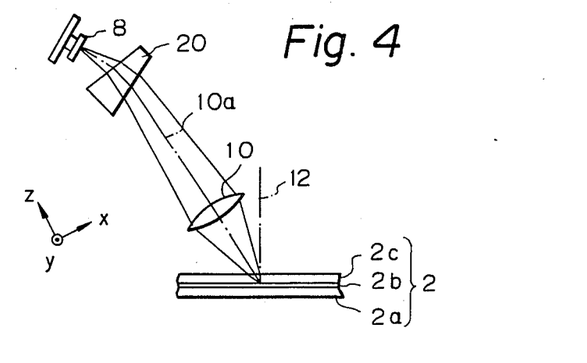
FIGS. 4, 5 and 6 show major portions of third, fourth and fifth embodiments of the present invention.

FIG. 4 shows a major portion of a third embodiment of the optical information reproducing apparatus of the present invention.

The present embodiment differs from the first embodiment in that a wedge-shaped prism 20 is used as an element to compensate for the astigmatism. The prism is arranged such that a normal line to the plane of the effective surface is in the x-z plane. Accordingly, the light flux transmitted through the prism 20 is deflected only in the x-y plane.

The following relation is met.

$$\Delta p' = d(1 - \cos^2 i_2 / \cos^2 i_2') / n' + \qquad (4)$$

$$p_1(1 - \cos^2 i_1 \cdot \cos^2 i_2 / \cos^2 i_1' \cdot \cos^2 i_2') \qquad (5)$$

$$\sin i_1 = n' \cdot \sin i_1 \qquad (6)$$

$$n' \cdot \sin i_2 = \sin i_2 \qquad (7)$$

where n' is a refractive index of the prism 20, d is a thickness of the prism 20 on an optical axis 10a, $\Delta p'$ is an astigmatism created by the prism 20, $p_1$ is a distance between a focus point when the prism 20 is not present and a refraction point on an exit side of the prism 20, $i_1$ is an exit angle of the prism, $i_{1'}$ and $i_{2'}$ are exit and incident refractive angles in the prism, and $i_{2'}$ is an incident angle of the prism. An apex angle $\sigma$ and a deflection angle $\epsilon$ of the prism are given by:

$$\sigma = i_2' + i_1 \qquad (8)$$

$$\epsilon = (i_2 + i') - \sigma \qquad (9)$$

In the present embodiment, the prism 20 is arranged at a position of a minimum deflection angle. Since $i_2 = i_{1'}$ and $i_{2'} = i_1$, in order to compensate for the astigmatism $\Delta p = 44$ μm of the example in the first embodiment, the prism 20 should have a characteristic of $n'=1.6$, $i_1=i_2=30°$, $d=8.7$ mm, $\sigma=36.4°$ and $\epsilon=23.6°$.

Figure 5:
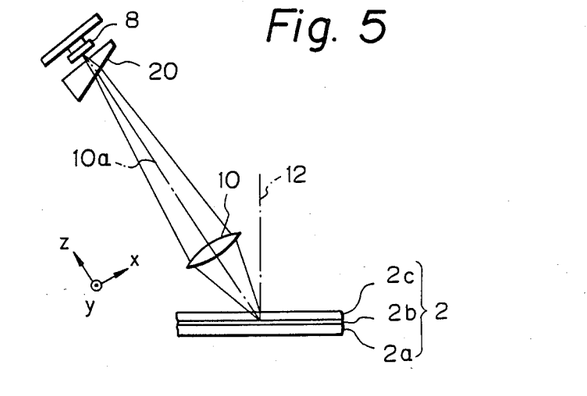

FIG. 5 shows a major portion of a fourth embodiment of the optical information reproducing apparatus of the present invention.

The present embodiment differs from the third embodiment in that the exit angle $i_1$ of the light flux from the prism 20 is 0°. The angle $i_1'$ is also 0°.

In the present embodiment, in order to compensate for the astigmatism $\Delta p=44$ μm in the example of the first embodiment, the prism 20 should have a characteristic of $n'=1.6$, $p_1=1$ mm, $i_2'=30°$, $d=7.1$ mm, $\sigma=18.2°$ and $\epsilon=11.8°$.

Figure 6:
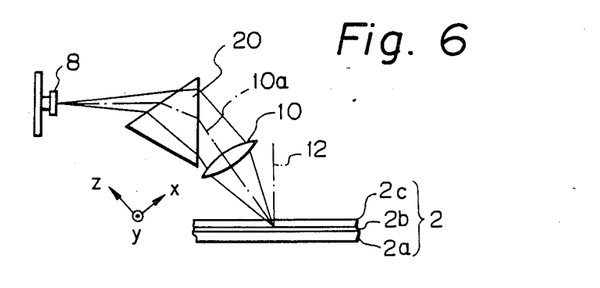

FIG. 6 shows a major portion of a fifth embodiment of the optical information reproducing apparatus of the present invention.

The present embodiment differs from the third and fourth embodiments in that the prism 20 projects the focusing light parallelly to the plane of the optical ROM card 2.

In the present embodiment, in order to compensate for the astigmatism $\Delta p=44$ μm in the example of the first embodiment, the prism 20 should have a characteristic of $n'=1.6$, $p_1=20$ mm, $i_1=68°$, $i_2'=60.3°$, $d=7.7$ mm, $\sigma=68.3°$ and $\epsilon=60°$.

In the present embodiment, since the focusing light is deflected parallelly to the plane of the optical ROM card 2 by the prism 20, the optical head can be thinned.

In the present invention, the astigmatism compensation optical element in the first, third, fourth or fifth embodiment may be shared with a light receiving window of the package of the photo-detector. The photo-detector is frequently constructed in a package having a front glass plate of the light receiving window in parallel to the plane of the photo-detector. In such a case, the parallel plate 14 or the prism 20 of the embodiment may be used in place of the glass plate.

FIG. 7 shows a sectional view of one embodiment of the package of the photo-detector. In FIG. 7, numeral 22 denotes a package body in which the photo-detector 8 is fixedly mounted. The prism 20 as a light receiving window is arranged at a predetermined positional relation to the photo-detector 8. The prism 20 may be replaced by the parallel plate 14. In the fourth embodiment shown in FIG. 5, the prism 20 may be simply mounted instead of the glass plate of the conventional package.

By constructing the package of the photo-detector and the astigmatism compensation optical element in one unit, the assembly and adjustment are easy to accomplish, cost is reduced and mass productivity is enhanced.

In the above embodiments, while the parallel plate, back surface mirror and prism are used as the astigmatism compensation element, other appropriate optical element may be used as the astigmatism compensation element.

Figure 8:
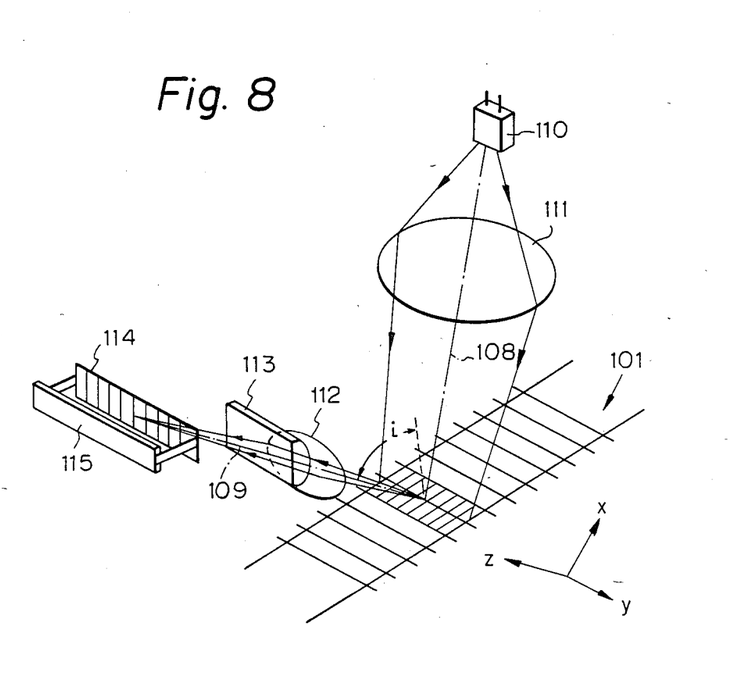
FIG. 8 shows a perspective view of a seventh embodiment of the optical information reproducing apparatus of the present invention.

FIG. 8 shows a perspective diagram of a seventh embodiment of the optical information reproducing apparatus of the present invention.

In FIG. 8, numeral 110 denotes a light source such as an LED or semiconductor laser mounted on a base, numeral 111 denotes an illumination optical system for radiating a light from the light source to an optical ROM card 101, numeral 114 denotes a linear array sensor such as a CCD, numeral 108 denotes an optical axis of the illumination optical system, and numeral 109 denotes an optical axis of an information read optical system. The objective lens 112, the cylindrical lens 113 and a diaphragm (not shown) constitute the information read optical system.

Figure 9A:
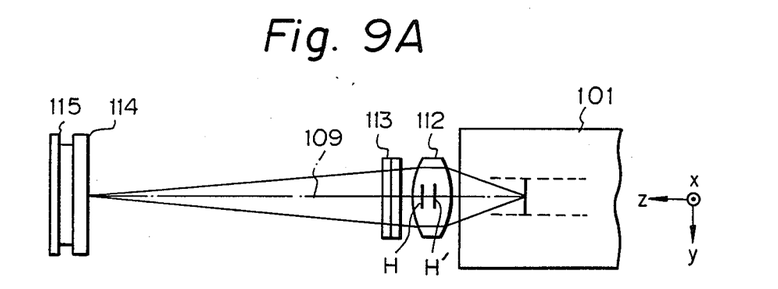
FIGS. 9A and 9B show views of an optical system of FIG. 8, as viewed laterally and vertically from an optical card.
Figure 9B:
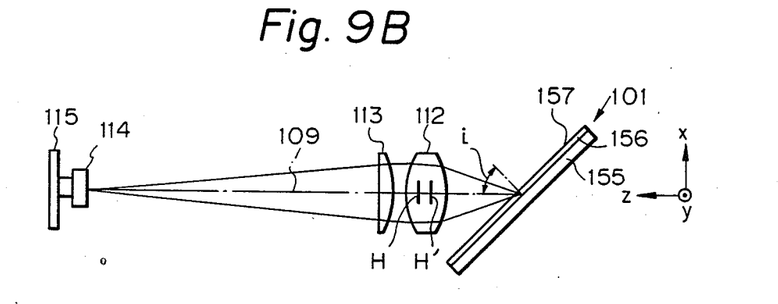

FIGS. 9A and 9B show views of the optical system of FIG. 8, as viewed from the top and side of the optical ROM card, respectively. For purposes of simplification, the illumination system 111 is omitted and only the read optical system is shown.

In the present embodiment, the optical axes 8 and 9 of the illumination optical system and the read optical system are set at an angle of 10°-60° with respect to the normal line of the optical ROM card 1 (see FIG. 9B). If the angle is smaller than 10°, the illumination optical system 111 and the read optical system would contact to each other. If the angle is larger than 60°, the astigmatism would vary by a slight angular error even if it is compensated, and hence perfect compensation would not be attained.

When the read optical system is arranged at such an angle, the astigmatism is created. As shown in "Optics" by H. Kubota, Chapter 5, published by Iwanami Shoten, the astigmatism $\Delta p$ is given by $$\Delta p = \frac{d}{n' \cdot \cos i'} \left( 1 - \frac{\cos^2 i}{\cos^2 i'} \right) \tag{1}$$

$$\sin i = n' \sin i' \tag{2}$$

where d is a thickness of a transparent medium 157, $n'$ is a refractive index, and i is a read angle.

For example, in the optical ROM card 101, when the thickness d of the transparent medium 157 is 400 μm, the refractive index $n'$ is 1.5 and the read angle i is 30°, then the astigmatism $\Delta p$ is 44.2 μm at $i'=19.47°$.

This means that an object point of the light flux of the y-z plane and an object point of the light flux of the x-z plane of the light flux applied to the objective lens are spaced from each other by 44.2 μm. If a focusing magnification of the objective lens of the read optical system is $-5\times$, the astigmatism on the linear sensor 5 is 1.105 mm. When a record pitch of the information plane is approximately 10 μm, the number of aperture NA of the objective lens on the side of information may be approximately 0.12. If there is no astigmatism, the depth of the information plane is 120 μm and a sufficient positional precision of the information plane is attained without auto-focusing. However, if there is an astigmatism, the depth is reduced to 90 μm and the positional precision of the information plane is not attained.

In the present embodiment, as shown in FIGS. 8 and 9B, a cylindrical lens 112 having a positive power on the x-z plane is arranged on the side of the objective lens 112 of the read optical system which faces the linear sensor 114 to compensate for the astigmatism. For example, when a focus length of the objective lens 112 is 6 mm, a focusing magnification is $-5\times$, a thickness d of the transparent medium 157 is 400 μm, a refractive index $n'$ is 1.5 and a read angle i is 30°, then a plane-convex cylindrical lens 113 having a radius of curvature of 295.3 mm and a convex plane facing the objective lens 112 and a refractive index of 1.5 may be arranged at a position spaced by 5 mm from a main plane of the objective lens 112 facing the linear sensor 114, toward the linear sensor 114.

The cylindrical lens 113 may be arranged either on the side of the objective lens 112 facing the linear sensor 114 or on the side facing the information recording plane 157 so long as it functions to shorten an object-image distance of the plane (x-z plane) which contains the optical axis of the objective lens 112 and the normal line to the information recording plane, that is, so long as it is a cylindrical lens having a positive power on the x-z plane. When it is arranged on the side facing the linear sensor, a requirement for assembly precision is less severe. When it is arranged on the side facing the information recording plane 157, a distance from the front end of the objective lens system to the object is smaller and a sufficient work distance for focusing is not maintained. Accordingly, it is preferable to arrange the cylindrical lens 113 on the side facing the linear sensor 114.

The cylindrical lens 113 may be one which has a negative power on the y-z plane to expand the object-image distance of the plane (y-z plane) which contains the optical axis of the objective lens 112 and is perpendicular to the plane (x-z plane) containing the optical axis of the objective lens 112 and the normal line to the information recording plane, which cylindrical lens is arranged on the side of the objective lens facing the linear sensor or the information recording plane. The side facing the linear sensor is preferable as it is for the positive cylindrical lens.

An eighth embodiment of the present invention is now explained. In the optical systems shown in FIGS. 8, 9A and 9B, the astigmatism created by the transparent medium can be compensated but a coma aberration cannot be compensated. Thus, when the NA of the objective lens is large, the thickness d of the transparent medium is thick or the read angle i is large, the imaging performance is deteriorated.

Figure 10:
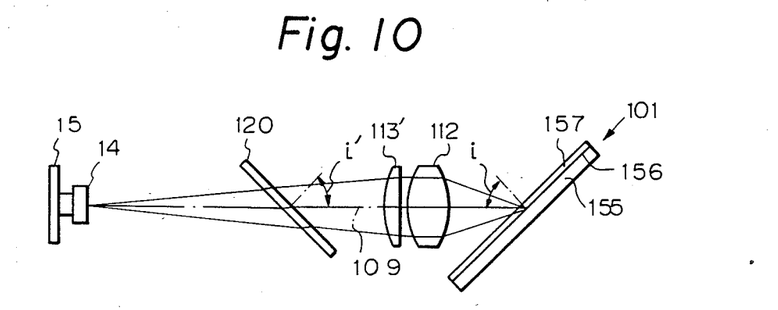
FIG. 10 shows an eighth embodiment of the present invention.

FIG. 10 shows a side view of an optical information reproducing apparatus which resolves the above problems. An illumination optical system 111 is omitted as is done in FIG. 9.

As shown in FIG. 10, a parallel plate 120 having the same thickness and refractive index as those of the transparent medium 157 is arranged such that a normal line to the parallel plate 120 and a normal line to the information recording plane 156 are on the same plane, and an angle i' between the normal line to the parallel plate 120 and the optical axis of the objective lens 112 and an angle i between the normal line to the information recording plane 156 and the optical axis of the objective lens 112 are substantially equal so that the coma aberration is compensated.

In this case, since the astigmatism is created by the parallel plate 120, the power of the cylindrical lens 113' should be approximately two times as high as that of the cylindrical lens 113 of FIG. 1.

The present invention is not limited to the above embodiments but various modifications and variations may be made.

For example, in the seventh and eighth embodiments shown in FIGS. 8 and 10, a mirror may be arranged between the information recording plane 156 and the linear sensor 114 to deflect the light for compactness.

In the present invention, the astigmatism compensation optical element may be a combination of a plurality of same or different astigmatism compensation optical element.

In the present invention, the astigmatism compensation optical element need not necessarily be arranged between the focusing lens and the photo-detector but it may be arranged between the optical information recording medium and the focusing lens. When the information recording plane is to be focused on the photo-detector with magnification, the astigmatism compensation optical element is preferably arranged between the focusing lens and the photo-detector because a light path length is longer and a space for mounting the optical element is larger. Since the astigmatism in the order of several tens $\mu$m is to be compensated, it is preferable to arrange the compensation optical element on the side of enlargement or the side facing the photo-detector because the precision for arranging the element is less severe.

The present invention is effective to the information recording medium having the information tracks of any angle to the optical axis of the focusing optical system.

In the above embodiment, the optical information recording medium is the optical ROM card although the present invention is equally applicable to other optical information recording medium such as optical card, optical disk or optical tape.

In accordance with the present invention, the astigmatism created by the transparent layer on the information recording medium is reduced and the focusing performance is improved so that the reliability of the information reproduction is enhanced. In the present invention, since the depth of focus is increased by reducing the astigmatism, the constraints on permissible warp of the optical information recording medium and the precisions of the hold mechanism and transport mechanism of the record medium are relieved and the precision of in-focus control is also relieved. Accordingly, the costs of the optical information record medium and the reproducing apparatus therefor can be reduced.

We claim:

1. An optical information reproducing apparatus for reproducing information of an optical information record medium having a transparent layer on an information recording plane, comprising:

hold means for holding said optical information record medium;

a focusing optical system having an optical axis inclined with respect to a normal line to the information recording plane of said optical information record medium held by said hold means;

a photo-detector arranged at a position to which the information recording plane is focused by said focusing optical system;

said photo-detector detecting an image of the information recording plane to reproduce the information of said optical information record medium; and an optical element arranged in said focusing optical system;

said optical element compensating for an astigmatism created by the transparent layer of said optical information record medium.

2. An optical information reproducing apparatus according to claim 1 wherein said optical element is a transparent parallel plate inclined in a plane containing an optical axis of said focusing optical system and orthogonal to a plane containing said optical axis and a normal line to the recording plane.

3. An optical information reproducing apparatus according to claim 1 wherein said optical element is a back surface mirror inclined in a plane containing an optical axis of said focusing optical system and orthogonal to a plane containing said optical axis and a normal line to the recording plane.

4. An optical information reproducing apparatus according to claim 1 wherein said optical element is a prism having a function to deflect light in a plane containing an optical axis of said focusing optical system and orthogonal to a plane containing said optical axis and a normal line to the recording plane.

5. An optical information reproducing apparatus according to claim 1 wherein said optical element is in a package of said photo-detector.

6. An optical information reproducing apparatus for reproducing information of an optical information record medium having a transparent layer on an information recording plane, comprising:
   hold means for holding said optical information record medium;
   a focusing optical system having an optical axis inclined with respect to a normal line to the information recording plane of said optical information record medium held by said hold means;
   a photo-detector arranged at a position to which the information recording plane is focused by said focusing optical system;
   said photo-detector detecting an image of the information recording plane to reproduce the information of said optical information record medium;
   a cylindrical lens arranged in said focusing optical system to compensate for an astigmatism created by the transparent layer of the record medium.

7. An optical information reproducing apparatus according to claim 6 wherein said photo-detector is of line or band shape and a longitudinal direction thereof is perpendicular to a plane containing the normal line to the information recording plane and an optical axis of said focusing optical system, and said cylindrical lens has a base lien thereof arranged in parallel to the longitudinal direction of said photo-detector.

8. An optical information reproducing apparatus according to claim 6 further comprising a parallel plate having a thickness and a refractive index substantially equal to those of the transparent layer,
   said parallel plate being arranged in said focusing optical system such that a normal line to said parallel plate is on a plane containing the normal line to the information recording plane and the optical axis of said focusing optical system, and an angle between the normal line to said parallel plate and the optical axis of said focusing optical system is substantially equal to an angle between the normal line to the information recording plane and the optical axis of said focusing optical system and in the opposite direction with respect to the optical axis of said focusing optical system.

9. An optical information reproducing apparatus for reproducing information of an optical information record medium having a transparent layer on an information recording plane, comprising:
   hold means for holding said optical information record medium;
   a focusing optical system having an optical axis inclined with respect to a normal line to the information recording plane of said optical information record medium held by said hold means;
   a photo-detector arranged at a position to which the information recording plane of said optical information record medium is focused by said focusing optical system, said photo-detector detecting an image of the information recording plane to reproduce the information of said optical information record medium; and
   a parallel plate arranged in said focusing optical system, said parallel plate arranged so as to be inclined with respect to the optical axis of said focusing optical system.

10. An optical information reproducing apparatus according to claim 9, wherein said parallel plate is inclined to a direction to compensate for an astigmatism created by the transparent layer of said optical information record medium.

11. An optical information reproducing apparatus according to claim 9, wherein said parallel plate is inclined to a direction to compensate for a coma created by the transparent layer of said optical information record medium.

* * * * *